United States Patent
Janasek

(10) Patent No.: US 7,972,240 B2
(45) Date of Patent: Jul. 5, 2011

(54) WORK MACHINE WITH POWER LIMIT CONTROL USING AN INFINITELY VARIABLE TRANSMISSION

(75) Inventor: Clayton George Janasek, Independence, KS (US)

(73) Assignee: Deere & Company, Moline, IL (US)

( * ) Notice: Subject to any disclaimer, the term of this patent is extended or adjusted under 35 U.S.C. 154(b) by 854 days.

(21) Appl. No.: 11/959,510

(22) Filed: Dec. 19, 2007

(65) Prior Publication Data

US 2009/0163319 A1 Jun. 25, 2009

(51) Int. Cl.
*B60W 10/02* (2006.01)
*B60W 10/10* (2006.01)

(52) U.S. Cl. .......................................... 477/39; 477/79

(58) Field of Classification Search .................... 477/79, 477/39

See application file for complete search history.

(56) References Cited

U.S. PATENT DOCUMENTS

| | | | |
|---|---|---|---|
| 4,368,798 A | 1/1983 | Meyerle et al. | |
| 4,635,494 A | 1/1987 | Conklin | |
| 4,704,922 A * | 11/1987 | Suketomo et al. | 475/64 |
| 4,735,597 A | 4/1988 | Cadee | |
| 5,002,170 A * | 3/1991 | Parsons et al. | 477/86 |
| 5,052,986 A | 10/1991 | Jarchow et al. | |
| 5,267,911 A | 12/1993 | Meyerle | |
| 5,514,046 A | 5/1996 | Petersmann et al. | |
| 5,695,422 A | 12/1997 | Otten | |
| 6,357,413 B1 | 3/2002 | Ito et al. | |
| 6,565,482 B2 * | 5/2003 | Kobayashi et al. | 477/174 |
| 6,800,049 B2 * | 10/2004 | Leising et al. | 477/39 |
| 7,022,043 B2 * | 4/2006 | Luh | 477/45 |
| 7,160,226 B2 * | 1/2007 | Fuller | 477/39 |
| 2007/0272455 A1 | 11/2007 | Lang et al. | |
| 2008/0171632 A1 * | 7/2008 | Van Allen | 477/79 |

* cited by examiner

*Primary Examiner* — Sherry Estremsky

(57) ABSTRACT

A work machine includes an internal combustion (IC) engine, and an infinitely variable transmission (IVT) coupled with the IC engine. The IVT includes an adjustable module and a mechanical module, with an adjustable input/output (I/O) ratio. A clutch is coupled with the mechanical module and has an output. An adjustable operator input device provides an output signal representing a power limit control. At least one electrical processing circuit is coupled with the operator input device and configured for controlling a selected combination of the I/O ratio and the clutch output, dependent upon the output signal from the operator input device.

16 Claims, 3 Drawing Sheets

WORK MACHINE WITH POWER LIMIT CONTROL USING AN INFINITELY VARIABLE TRANSMISSION

FIELD OF THE INVENTION

The present invention relates to work machines, and, more particularly, to work machines including an internal combustion engine coupled with an infinitely variable transmission (IVT).

BACKGROUND OF THE INVENTION

A work machine, such as a construction work machine, an agricultural work machine or a forestry work machine, typically includes a prime mover in the form of an internal combustion (IC) engine. The IC engine may either be in the form of a compression ignition engine (i.e., diesel engine) or a spark ignition engine (i.e., gasoline engine). For most heavy work machines, the prime mover is in the form of a diesel engine having better lugging, poll-down and torque characteristics for associated work operations.

The step load response of an IC engine in transient after a load impact is a feature mostly influenced by the engine displacement, the hardware of the engine (e.g., whether it has a standard turbocharger, a turbocharger with waste gate or variable geometry, etc.), and by the software strategy for driving the air and fuel actuators (e.g., exhaust gas recirculation, turbocharger with variable geometry turbine (VGT), fuel injector configuration, etc.) with respect to the requirements of emissions legislation (e.g., visible smoke, nitrous oxides (NOx), etc.), noise or vibrations. The load impact may be the result of a drivetrain load (e.g., an implement towed behind the work machine) or an external load (e.g., an auxiliary hydraulic load such as a front end loader, backhoe attachment, etc.).

Engine systems as a whole react in a linear manner during the application of a transient load. Initially, the load is applied to the drive shaft of the IC engine. The IC engine speed decreases when the load increases. The engine speed drop is influenced by whether the governor is isochronous or has a speed droop. The airflow is increased to provide additional air to the IC engine by modifying the air actuators. A time delay is necessary to achieve the new air flow set point. The fuel injection quantity, which is nearly immediate, is increased with respect to both the smoke limit and maximum allowable fuel quantity. The engine then recovers to the engine speed set point. The parameters associated with an engine step load response in transient after a load impact are the speed drop and the time to recover to the engine set point.

An IC engine may be coupled with an IVT which provides continuous variable output speed from 0 to maximum in a stepless fashion. An IVT typically includes hydrostatic and mechanical gearing components. The hydrostatic components convert rotating shaft power to hydraulic flow and vice versa. The power flow through an IVT can be through the hydrostatic components only, through the mechanical components only, or through a combination of both depending on the design and output speed.

One example of an IVT for use in a work machine is a hydromechanical transmission which includes a hydraulic module coupled with a planetary gear set. Another example of an IVT for a work machine is a hydrostatic transmission which includes a hydraulic module coupled with a gear set.

A work machine including an IVT may be prone to loss of traction control and wheel slip when the IVT ratio changes to match load conditions. The IVT controller senses engine speed and deepens the IVT ratio as engine speed decreases under load. When at low ground speeds, the amount of power required for the work machine is a low percentage of what the engine can generate, so the engine may not lug down when the output torque from the engine increases. The operator will then not be aware that the torque at the wheels is increasing. In this case, the drive wheels can lose traction and spin out without notice.

In many construction or agriculture machinery applications it is desirable to limit or eliminate wheel spin (tractive effort) while the machine is under load so as not to disturb the surface upon which the machine is working. Current four-wheel-drive (4WD) front end loaders manufactured by the assignee of the present invention, such as the model 644J, 724J, and 824J, contain torque converter-driven powershift transmissions. Torque converter-driven machines limit tractive effort by naturally providing torque input control to the transmission via the speed differential across the torque converter. This speed differential is a function of vehicle ground speed and engine speed. As the ground speed approaches zero, the converter output torque approaches the stall torque for the present converter input speed (engine speed). The stall torque therefore is proportional to engine speed. The operator controls engine speed via a foot throttle pedal, and thus controls torque to the transmission and therefore controls machine tractive effort. Tractive effort control is especially important in a 4WD loader application when the machine is loading the bucket. The operator wants the machine to "push" the pile with a consistent force without spinning the tires in order to fill the bucket completely.

One problem with this configuration has to do with the very features that make it desirable for controlling tractive effort. Consider the 4WD loader bucket loading case: As the machine digs into the pile, the load increases significantly. The torque converter can only supply a finite amount of torque for the given engine and ground speeds, and so the ground speed decreases as the load from the pile overcomes the converter torque capacity. As the ground speed decreases, the speed differential across the torque converter increases. The operator may then wish to increase tractive effort, and thus increases engine speed to increase torque. This cycle can continue until the machine either cannot provide enough tractive effort to dig further into the pile, or the tires spin out. In both cases, there is significant speed differential across the torque converter, and the converter is providing a significant torque to the transmission at very low speeds. Thus, the problem presents as a significant power loss across the torque converter, with the energy being dissipated as heat into the converter fluid. With power loss comes added fuel burn, which translates into reduced fuel efficiency which gets worse with increased converter speed differential and torque.

One attempted solution to address the fuel efficiency problem has been to place a hydrostatically driven transmission into a 4WD loader. The hydrostatic transmission offers the benefits of increased efficiency in the above case by providing near infinite speed ratios which allow the transmission output speed to be controlled to near zero at any engine speed, with no "slipping" across any elements. Thus the fuel efficiency improves. However, as before the problem with this configuration results from its very features. As the transmission input-to-output speed ratio gets very large (near zero output speeds), the transmission output torque rises proportionally. Thus, the operator has no limit controls over the tractive effort. For the bucket loading case above, the machine simply spins the tires during loading, with no way to eliminate it.

What is needed in the art is a work machine configured with an IVT which is not prone to losing traction in low ground speed conditions.

SUMMARY OF THE INVENTION

The invention in one form is directed to a work machine including an IC engine, and an IVT coupled with the IC engine. The IVT includes an adjustable module and a mechanical module, with an adjustable input/output (I/O) ratio. A clutch is coupled with the mechanical module and has an output. An adjustable operator input device provides an output signal representing a power limit control. At least one electrical processing circuit is coupled with the operator input device and configured for controlling a selected combination of the I/O ratio and the clutch output, dependent upon the output signal from the operator input device.

The invention in another form is directed to a method of operating a work machine including an IC engine, an IVT and a clutch. The method includes the steps of: outputting an output signal from an operator input device to an electrical processing circuit corresponding to a maximum allowable ground speed and a maximum allowable output torque from the clutch; and controlling a selected combination of an I/O ratio of the IVT and a clutch pressure of the clutch, dependent upon the output signal from the operator input device.

DETAILED DESCRIPTION OF THE INVENTION

Figure 1:
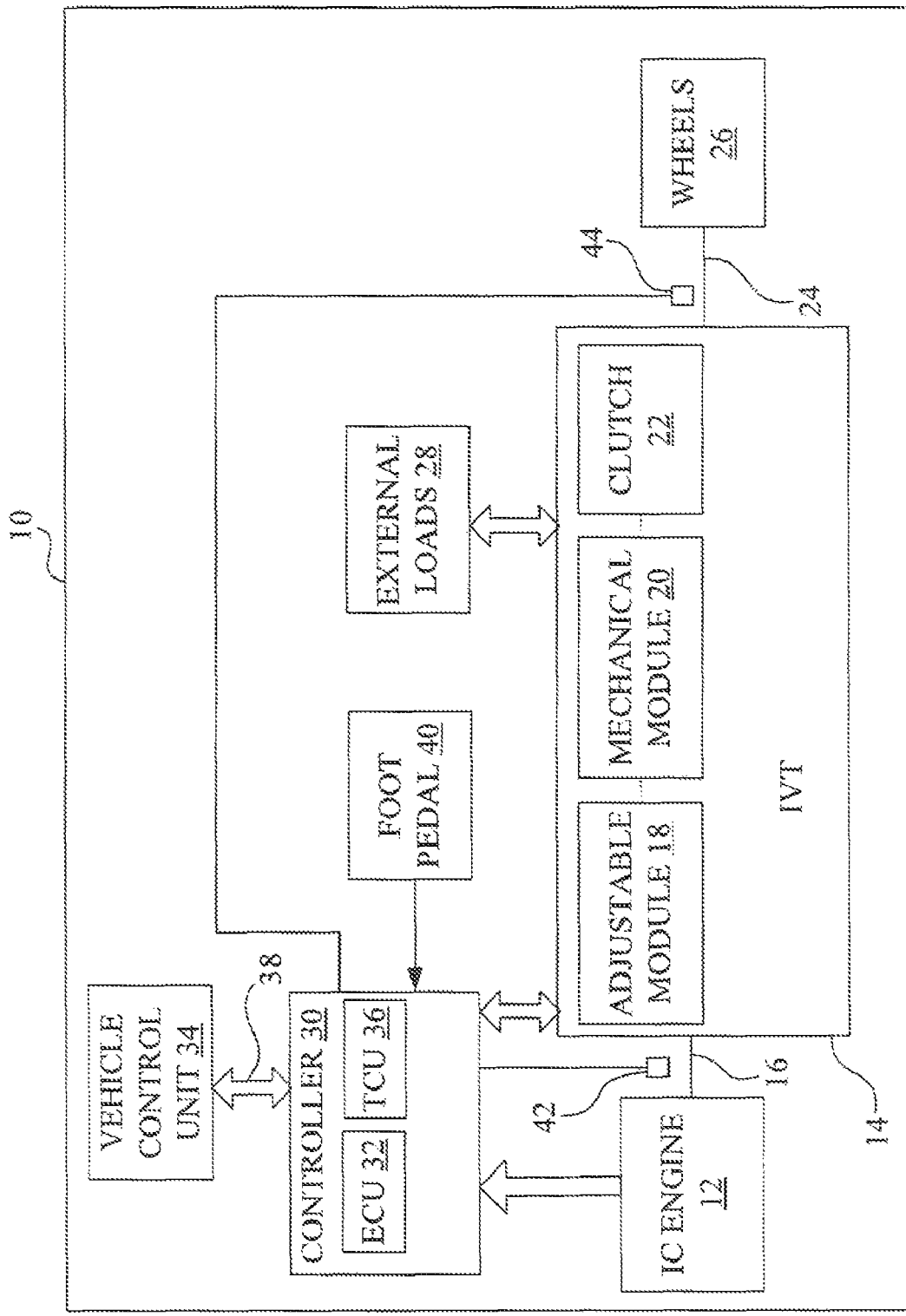
FIG. 1 is a schematic illustration of an embodiment of a work machine of the present invention.

Referring now to FIG. 1, there is shown a schematic illustration of an embodiment of a work machine 10 of the present invention. Work machine 10 could be a road grader, or a construction work machine such as a John Deere front end loader, or a different type of work machine such as an agricultural, forestry, mining, or industrial work machine.

Work machine 10 includes an IC engine 12 which is coupled with an IVT 14, typically through an output crankshaft 16 from IC engine 12. IC engine 12 is assumed to be a diesel engine in the illustrated embodiment, but could also be a gasoline engine, propane engine, etc. IC engine 12 is sized and configured according to the application.

IVT 14 generally includes an adjustable module 18, mechanical module 20 (e.g., drive train), and a clutch 22. IVT 14 is assumed to be a hydromechanical transmission in the embodiment shown, but could also be a hydrostatic transmission, electromechanical transmission, or other type of IVT. When configured as a hydromechanical transmission (as in the illustrated embodiment), the adjustable module is in the form of a hydraulic module 18 with a hydraulic pump and motor. When configured as an electromechanical transmission (not shown), the adjustable module is in the form of an electric generator and motor. IVT 14 may be of conventional design, and thus is not described in great detail herein.

IVT 14 has an output which is coupled with at least one other downstream drive train component 24, which in turn is coupled with a plurality of drive wheels 26, one of which is shown in FIG. 1. Of course, it will be appreciated that in the case of a track-type work vehicle, drive train component 24 may be coupled with a ground engaging track.

Clutch 22 is an electronically controllable clutch which is integrally incorporated into IVT 14. Clutch 22 may be selectively adjusted to a desired clutch pressure at which clutch slip begins to occur. Clutch 22 may be of conventional design and is not described in great detail herein. It will also be appreciated that clutch 22 may be separate from IVT 14 and coupled with the output from mechanical module 20 of IVT 14.

IVT 14 also provides output power to one or more external loads 28, which in turn thus provide an additional load on IC engine 12. External loads 28 typically are in the form of hydraulic loads, such as a front end loader, back hoe boom, grain unloading auger, tree felling saw motor, etc. The total load placed upon IC engine 12 thus is a function of both tractive loads and external hydraulic loads.

An electrical processing circuit 30 is configured as one or more controllers. In the embodiment shown, controller 30 includes an engine control unit (ECU) 32 which electronically controls operation of IC engine 12, and is coupled with a plurality of sensors (not specifically shown) associated with operation of IC engine 12. For example, ECU 32 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 32 may receive output signals from vehicle control unit (VCU) 34 representing vehicle control parameters input by an operator, such as a commanded ground speed (indicated by a position of the throttle and/or hydrostat pedal) or a commanded direction of work machine 10 (indicated by an angular orientation of the steering wheel).

Similarly, transmission control unit (TCU) 36 electronically controls operation of IVT 14, and is coupled with a plurality of sensors associated with operation of IVT 14. ECU 32, VCU 34 and TCU 38 are coupled together via a bus structure providing two-way data flow, such as controller area network (CAN) bus 38.

An operator input device 40 allows an operator to adjust the power limit control from IVT 14. In the embodiment shown, operator input device 40 is configured as a foot pedal. Foot pedal 40 provides output signals to TCU 36 representing a position of the foot pedal. The output signals are correlated into a maximum allowable ground speed and a maximum allowable output torque, as will be described below.

Controller 30 also receives output signals from sensors 42 and 44 representing the input and output, respectively, to IVT 14. The signals from sensors 42 and 44 may be used to determine ground speed, I/O ratio, clutch slip, etc.

Although the various electronic components such as ECU 32, VCU 34 and TCU 36 are shown coupled together using wired connections, it should also be understood that wireless connections may be used for certain applications. Further, some of the internal electronic and fluid connections within the components of FIG. 1 are not shown for simplicity sake.

Figure 2:
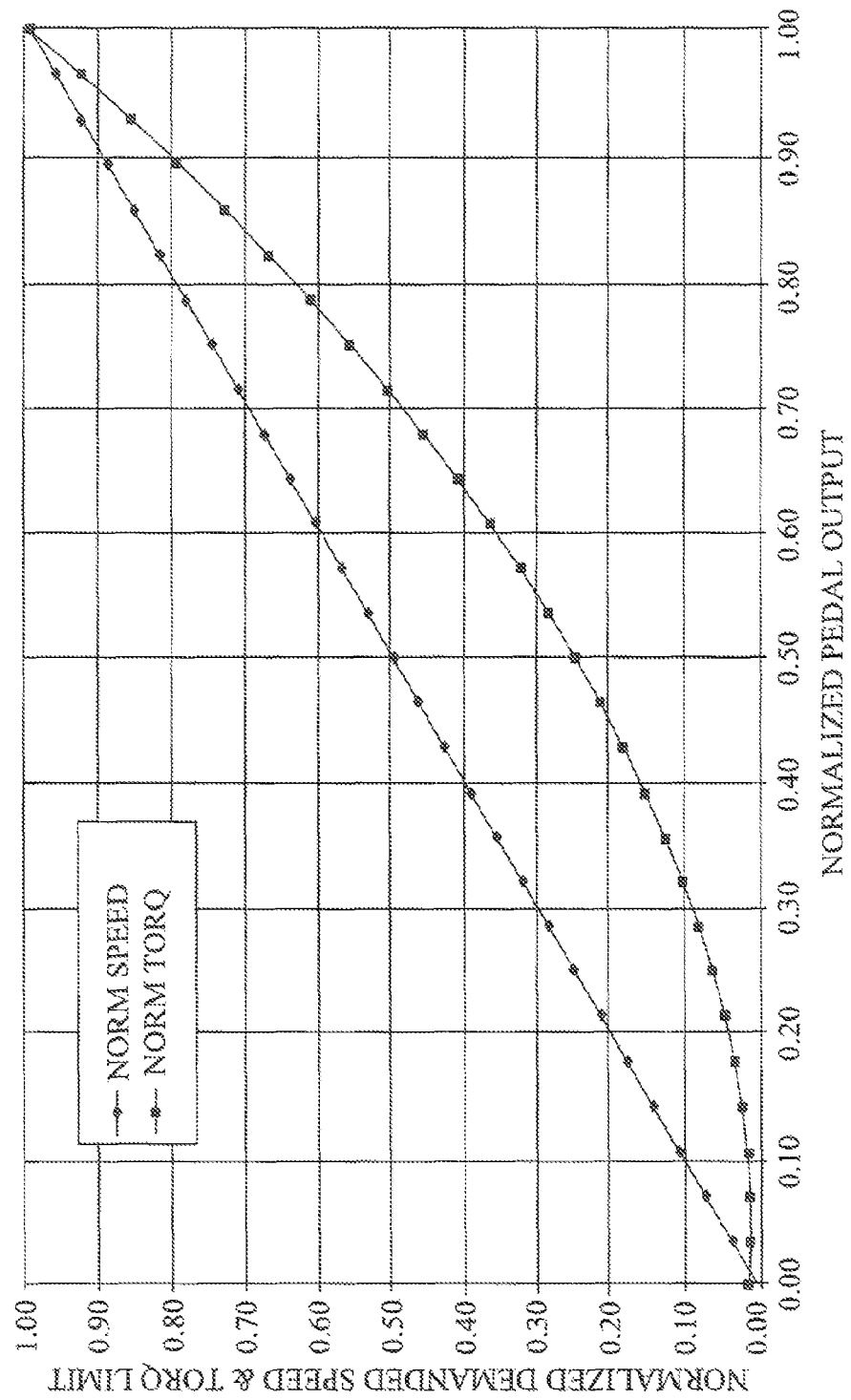
FIG. 2 is a graphical illustration of the relationship between foot pedal output vs. ground speed and torque output.

Using the method of operation of the present invention, both the maximum allowable ground speed and torque values are normalized from 0-100%, with 100% being the maximum allowed for the present vehicle ground speed. FIG. 2 shows a plot of normalized maximum allowable ground speed and normalized maximum transmission output torque vs. pedal percentage. Transmission output torque limiting is accomplished by limiting the maximum pressure on the transmission output clutch. As the load increases, the clutch begins to slip and thus the output speed begins to decrease due to the limited amount of available torque. To keep power loss low due to the slippage, the transmission's hydrostatic module strokes to maintain a very small amount of differential speed across the slipping clutch. If the load continues to increase, the output speed may approach zero, while hydraulic module 18 continues to destroke and maintain that slip speed. All the while, the torque capacity remains the same, allowing the machine to maintain constant tractive effort against the load. An operator desiring more machine effort simply depresses the foot pedal further, thereby increasing clutch pressure which raises the transmission torque capacity. At that point, if the load is not sufficient to keep the machine stopped, the differential speed across the slipping clutch may go to zero (clutch locks back up). The control logic recognizes that, and then begins to stroke in order to attempt to achieve the desired ground speed target, also set by the pedal position. Any time the clutch begins to slip, the control logic commands hydraulic module 18 to "follow", and any time the clutch does not slip, the logic commands hydraulic module 18 to achieve the targeted ground speed. Therefore, the present invention provides a direct operator input to limit transmission output torque and speed.

Figure 3:
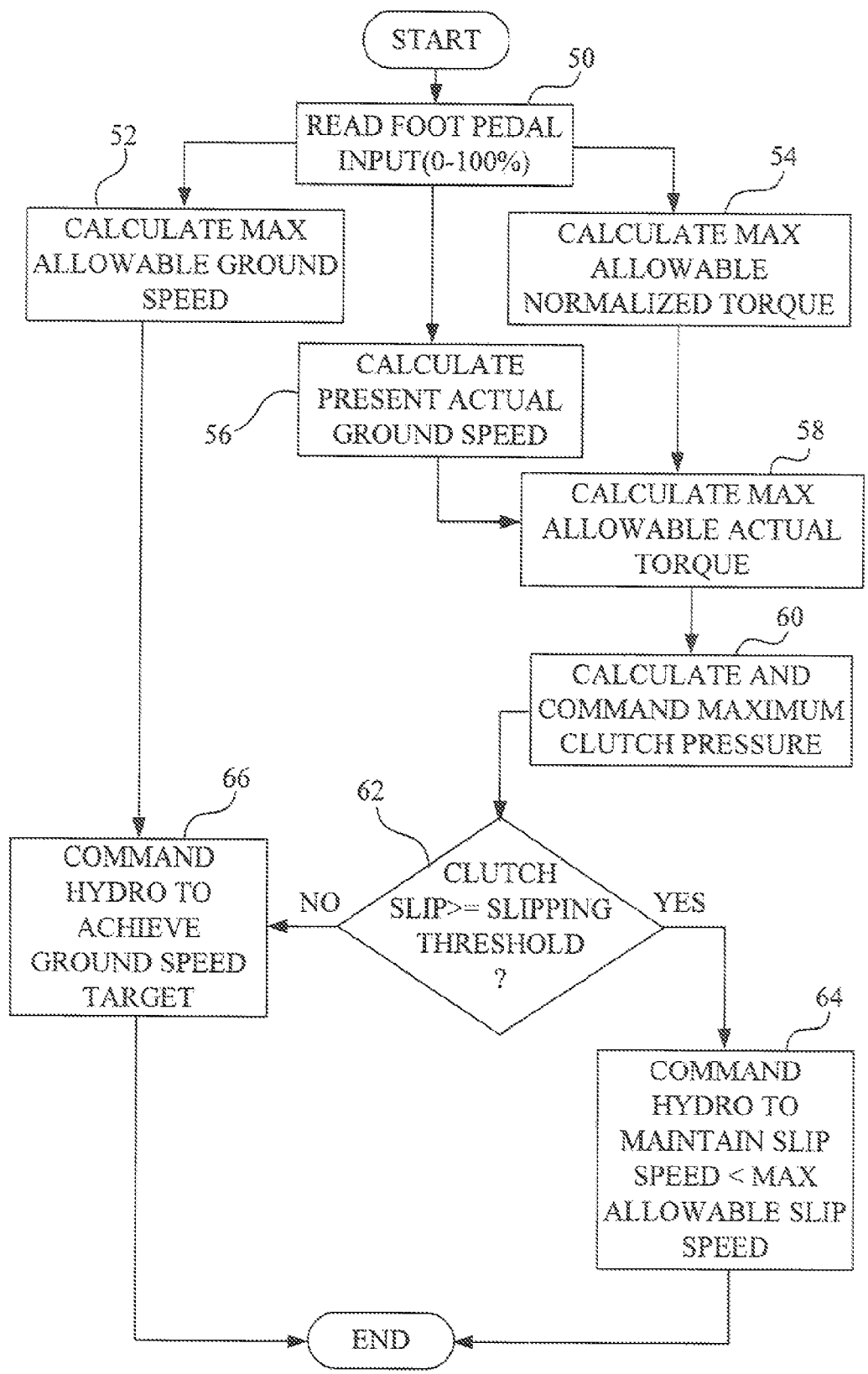
FIG. 3 illustrates a flowchart of an embodiment of the method of operation of a work machine of the present invention.

Referring now to FIG. 3, an embodiment of the method of the present invention for operation of work machine 10 will be described in greater detail.

During operation, the operator maintains use of a foot pedal, but this time instead of controlling engine speed directly, the pedal limits transmission output power directly. The pedal has a travel range of 0-100%, with 100% being fully depressed. This pedal percentage is input into the control algorithm. The control logic then refers to look-up tables which 1) relate the pedal percentage into a maximum allowable ground speed and 2) relate the pedal percentage into maximum allowable transmission output torque.

Foot pedal 40 provides an output signal to TCU 38 representing a position of foot pedal 40. The output signal from foot pedal 40 is normalized to a value between 0 to 100% (block 50). Based on the pedal position, a maximum allowable ground speed and maximum allowable normalized torque are calculated (blocks 52 and 54). Using the present actual ground speed (block 56) and normalized maximum allowable torque (from block 54), a maximum allowable actual torque is calculated for the present ground speed (block 58). Based on that, the maximum clutch pressure is commanded (block 80). Next, the control logic checks for clutch "slippage" using sensors 42 and 44 and the known I/O ratio of IVT 14 (decision block 62). Slippage is defined as a differential speed across the clutch greater than or equal to the slipping threshold (an RPM value). If the clutch is slipping, hydraulic module 18 is directed to maintain the slip speed to no more than the maximum allowable slip (an RPM value) (block 84). If the clutch is not slipping (differential speed less than the slipping threshold), hydraulic module 18 is directed to achieve the maximum ground speed targeted by the pedal position (block 86).

The benefits of this method combine the best feature of the torque converter system (torque control) and the best features of the hydrostatic system (infinite speed control and fuel efficiency). Torque control is accomplished by limiting the maximum allowable transmission torque as a function of foot pedal position. Transmission torque limiting is effected through limitation of the output clutch pressure. Speed control is accomplished by use of an IVT or hydrostatic transmission with a maximum allowable ground speed as a function of the foot pedal position. Fuel efficiency gains are accomplished by continuously monitoring the differential speed (slip speed) across the output clutch. The transmission hydrostatic modules (18 and 20) stroke appropriately to limit the slip speed to a very small value, thus limiting the power loss through the clutch.

Having described the preferred embodiment, it will become apparent that various modifications can be made without departing from the scope of the invention as defined in the accompanying claims.

The invention claimed is:

1. A work machine, comprising:
an internal combustion (IC) engine;
an infinitely variable transmission (IVT) coupled with said IC engine, said IVT including an adjustable module and a mechanical module, said IVT having an adjustable input/output (I/O) ratio;
a clutch coupled with said mechanical module, said clutch having an output;
an adjustable operator input device providing an output signal representing a power limit control;
at least one electrical processing circuit coupled with said operator input device and configured for controlling a selected combination of said I/O ratio and said clutch output, dependent upon said output signal from said operator input device; and
said at least one electrical processing circuit correlates said output signal from said operator input device into a maximum allowable ground speed and a maximum allowable output torque from said clutch.

2. The work machine of claim 1, wherein said operator input device is a foot pedal.

3. The work machine of claim 1, wherein said at least one electrical processing circuit correlates a position of said foot pedal to a normalized value between 0 and 1, and correlates said normalized value of said foot pedal position with a normalized value between 0 and 1 for each of said maximum allowable ground speed and said maximum allowable output torque.

4. The work machine of claim 1, wherein said maximum allowable output torque corresponds to a maximum clutch pressure on said clutch at which slip begins to occur.

5. The work machine of claim 4, wherein when said maximum allowable output torque occurs and said clutch begins to slip, said at least one electrical processing circuit adjusts said I/O ratio to substantially match with a current ground speed of said work machine.

6. The work machine of claim 4, wherein when said clutch is not slippling, said at least one electrical processing circuit adjusts said I/O ratio to substantially match with a desired ground speed associated with said output signal from said foot pedal.

7. The work machine of claim 1, wherein said IVT integrally includes said clutch.

8. The work machine of claim 1, wherein said at least one electrical processing circuit includes a transmission control unit (TCU) associated with said IVT.

9. The work machine of claim 1, wherein said work machine comprises one of a construction work machine, an agricultural work machine, a forestry work machine, a mining work machine, and an industrial work machine.

10. A method of operating a work machine including an internal combustion (IC) engine, an infinitely variable transmission (IVT) and a clutch, said method comprising the steps of:
outputting an output signal from an operator input device to an electrical processing circuit corresponding to a maximum allowable ground speed and a maximum allowable output torque from said clutch; and
controlling a selected combination of an I/O ratio of said IVT and a clutch pressure of said clutch, dependent upon said output signal from said operator input device.

11. The method of operating a work machine of claim 10, wherein said operator input device is a foot pedal.

12. The method of operating a work machine of claim 11, including the steps of:
  correlating a position of said foot pedal to a normalized value between 0 and 1; and
  correlating said normalized value of said foot pedal position with a normalized value between 0 and 1 for each of said maximum allowable ground speed and said maximum allowable output torque.

13. The method of operating a work machine of claim 10, wherein said maximum allowable output torque corresponds to a maximum clutch pressure on said clutch at which slip begins to occur.

14. The method of operating a work machine of claim 13, wherein when said maximum allowable output torque occurs and said clutch begins to slip, said at least one electrical processing circuit adjusts said I/O ratio to substantially match with a current ground speed of said work machine.

15. The method of operating a work machine of claim 13, wherein when said clutch is not slippling, said at least one electrical processing circuit adjusts said I/O ratio to substantially match with a desired ground speed associated with said output signal from said operator input device.

16. The method of operating a work machine of claim 10, wherein said IVT integrally includes said clutch.

* * * * *